US010838901B1

(12) United States Patent
Chinchole et al.

(10) Patent No.: US 10,838,901 B1
(45) Date of Patent: Nov. 17, 2020

(54) SYSTEM AND METHOD FOR A RECONFIGURABLE CONTROLLER BRIDGE CHIP

(71) Applicant: SanDisk Technologies LLC, Addison, TX (US)

(72) Inventors: Vijay Sukhlal Chinchole, Bangalore (IN); Siva Raghu Ram Voleti, Bangalore (IN); Nitin Gupta, Noida (IN); Ramakrishnan Karungulam Subramanian, Bangalore (IN); Shiv Harit Mathur, Bangalore (IN); Yan Li, Milpitas, CA (US); Vinayak Ashok Ghatawade, Bangalore (IN)

(73) Assignee: SanDisk Technologies LLC, Addison, TX (US)

( * ) Notice: Subject to any disclaimer, the term of this patent is extended or adjusted under 35 U.S.C. 154(b) by 0 days.

(21) Appl. No.: 16/657,977

(22) Filed: Oct. 18, 2019

(51) Int. Cl.
*G06F 13/40* (2006.01)
*G06F 1/10* (2006.01)
*G06F 13/12* (2006.01)
*G06F 11/10* (2006.01)

(52) U.S. Cl.
CPC .......... *G06F 13/4027* (2013.01); *G06F 1/10* (2013.01); *G06F 11/1004* (2013.01); *G06F 13/126* (2013.01)

(58) Field of Classification Search
CPC combination set(s) only.
See application file for complete search history.

(56) References Cited

U.S. PATENT DOCUMENTS

| 8,892,800 | B2 * | 11/2014 | Hunsaker | G06F 13/4234 710/110 |
| 2009/0300237 | A1 * | 12/2009 | Nobunaga | G06F 13/1694 710/61 |
| 2011/0040924 | A1 * | 2/2011 | Selinger | G06F 11/10 711/103 |
| 2011/0264851 | A1 * | 10/2011 | Jeon | G11C 16/10 711/103 |
| 2013/0326090 | A1 * | 12/2013 | Gillingham | G06F 13/1684 710/5 |
| 2014/0293705 | A1 * | 10/2014 | Gillingham | G11C 16/06 365/185.18 |
| 2015/0160688 | A1 * | 6/2015 | Chang | G06F 1/08 713/501 |
| 2016/0139983 | A1 * | 5/2016 | Chang | G11C 29/52 714/53 |
| 2016/0189758 | A1 * | 6/2016 | Desireddi | G11C 29/023 365/193 |
| 2020/0194065 | A1 * | 6/2020 | Schmier | G11C 16/08 |

* cited by examiner

*Primary Examiner* — Raymond N Phan
(74) *Attorney, Agent, or Firm* — Vierra Magen Marcus LLP

(57) ABSTRACT

An illustrative embodiment disclosed is a circuit including an edge-triggered flip-flop having a first input port, a first clock port, and a first output port. The edge-triggered flip-flop receives, at the first clock port, a strobe having a first edge and a second edge. The edge-triggered flip-flop receives, at the first input port, a control byte time-aligned with the first edge and a data byte time-aligned with the second edge. The edge-triggered flip-flop passes, to the first output port, the control byte based on the first edge and the data byte based on the second edge. The circuit includes an inputs/outputs (I/O) decoder coupled to the first output port. The I/O decoder sends the control byte to microcontroller and sends the data byte to memory cells.

20 Claims, 14 Drawing Sheets

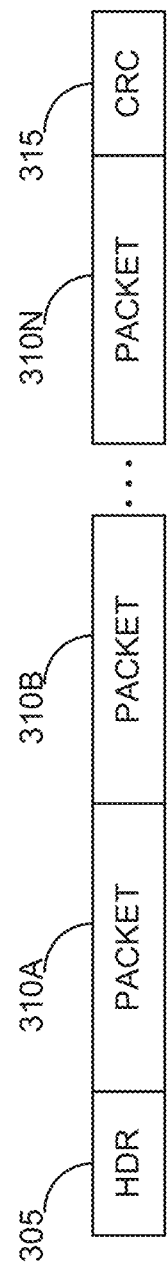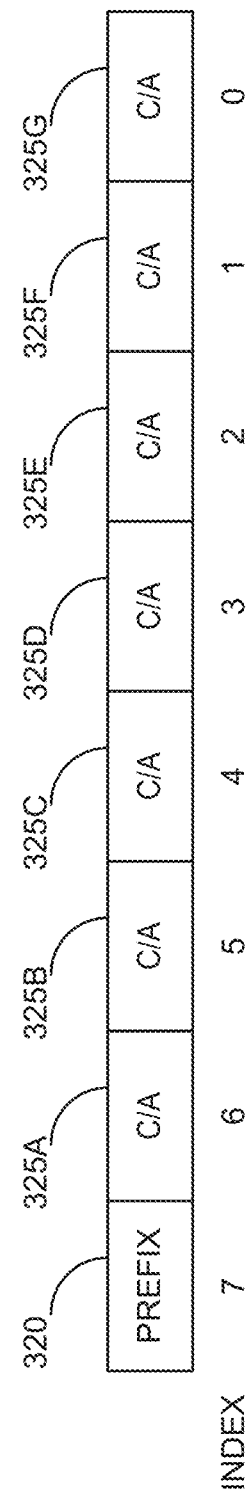

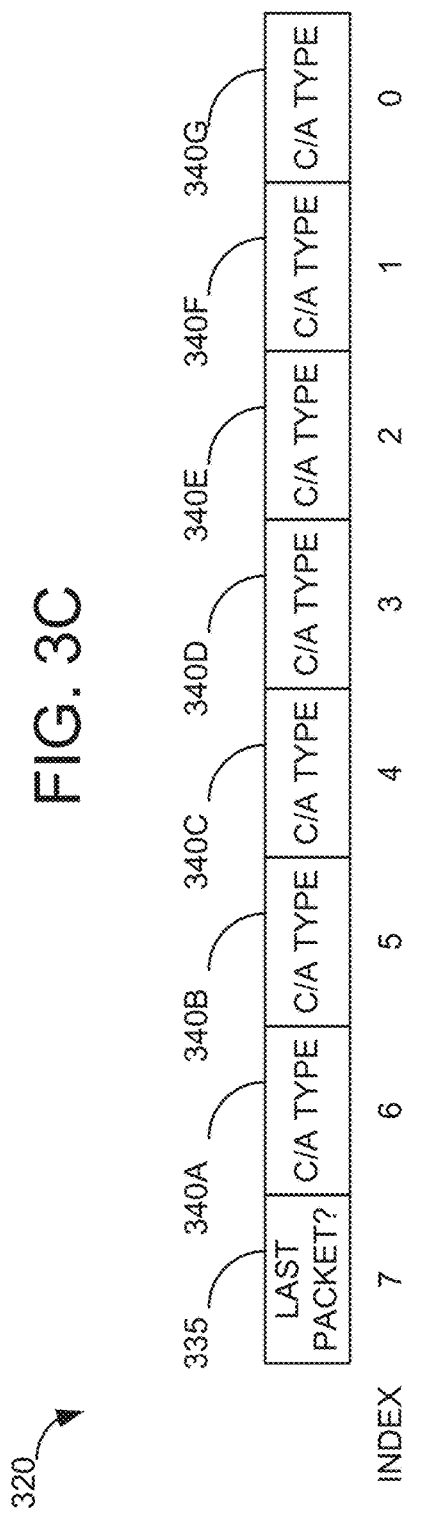

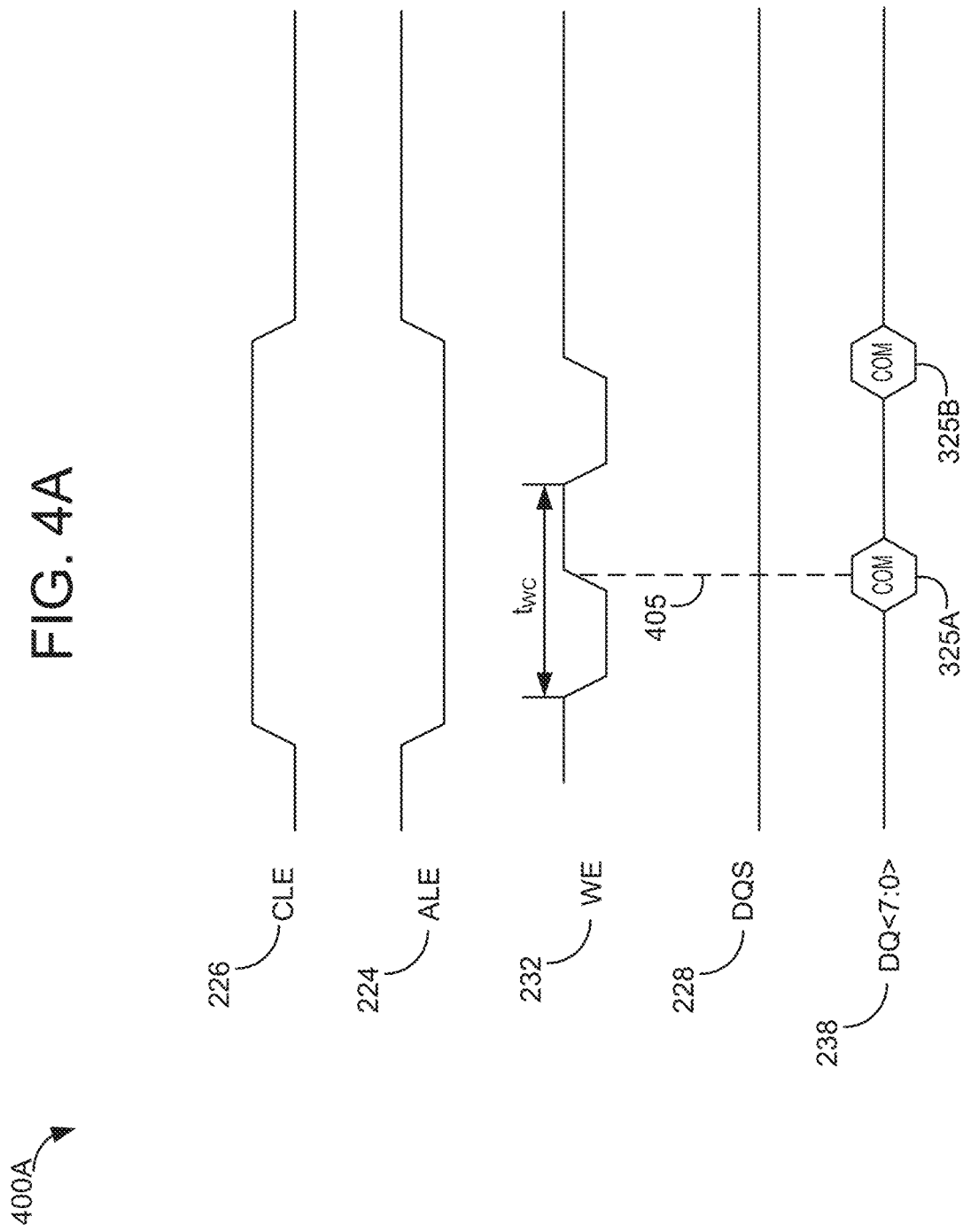

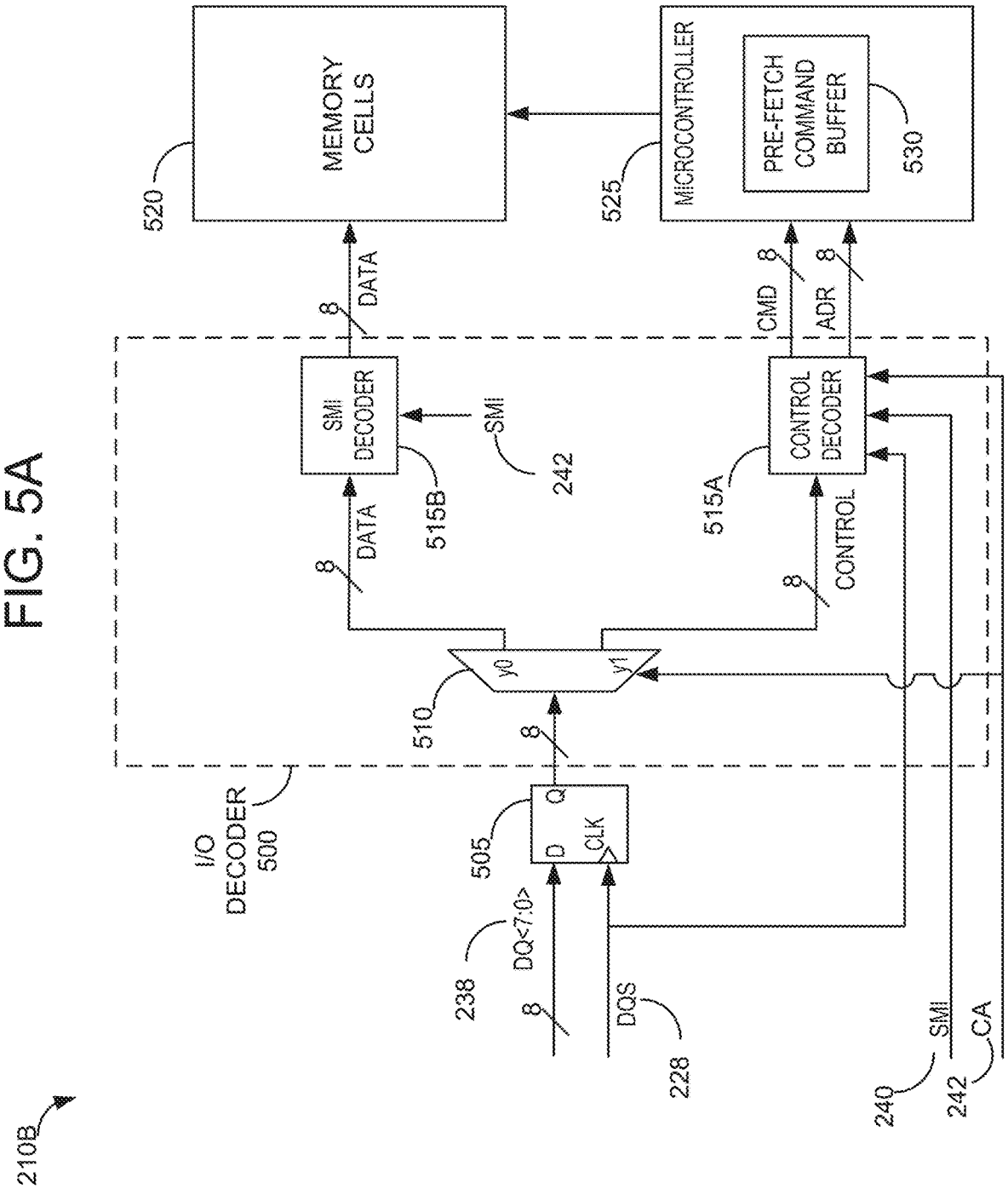

SYSTEM AND METHOD FOR A RECONFIGURABLE CONTROLLER BRIDGE CHIP

BACKGROUND

Computing techniques for processing data generally require copying executable code and data from a non-volatile memory array into a volatile memory before applying the executable code to the data. The results of the processing are then returned to the non-volatile memory array. Reading information (e.g., data and executable code) from or writing information (e.g., data) to the non-volatile memory array occurs by communication between a memory controller and a memory module of the non-volatile memory array. One of the techniques for communication between the memory controller and the memory module includes a Toggle Mode interface. Toggle Mode is defined herein as a mode that supports using both low and high edges of a strobe signal for reading and writing data. Examples of Toggle Mode include Toggle Mode Double Data Rate Version 4 (TM4). The Toggle Mode interface allows data transfer at twice the speed of a non-Toggle Mode interface. However, a Toggle Mode interface has limitations.

SUMMARY

An illustrative embodiment disclosed herein is a circuit including an edge-triggered flip-flop having a first input port, a first clock port, and a first output port. The edge-triggered flip-flop receives, at the first clock port, a strobe having a first edge and a second edge. The edge-triggered flip-flop receives, at the first input port, a control byte time-aligned with the first edge and a data byte time-aligned with the second edge. The edge-triggered flip-flop passes, to the first output port, the control byte based on the first edge and the data byte based on the second edge. The circuit includes an inputs/outputs (I/O) decoder coupled to the first output port. The I/O decoder sends the control byte to a microcontroller and sends the data byte to memory cells.

In some embodiments, the I/O decoder includes a first demultiplexer (demux) having a second input port coupled to the first output port, a first selector port, a data output port coupled to the memory cells, and a control output port coupled to the microcontroller. In some embodiments, the first demux receives, at the second input port, the control byte and the data byte, receives, at the first selector port, a command/address (CA) enable having a first level time-aligned with the first edge and a second level time-aligned with the second edge, sends the control byte to the control output port based on the first level, and sends the data byte to the data output port based on the second level.

In some embodiments, the first demux has a command output port coupled to a command portion of the microcontroller and an address output port coupled to an address portion of the microcontroller. In some embodiments, first demux receives, at the second input port, the control byte and receives, at the first selector port, a first prefix bit. In some embodiments, the first demux, responsive to the first prefix bit having a first value, sends the control byte to the command output port and, responsive to the first prefix bit having a second value, sends the control byte to the address output port;

An illustrative embodiment disclosed herein is a system including a controller that generates and sends a first plurality of bytes including a command byte, a second plurality of bytes including a data byte, and a strobe. The system includes a bridge device coupled to the controller via a narrow I/O interface. The bridge device receives each byte of the first plurality of bytes at a different time and on the narrow I/O interface and sends the first plurality of bytes at a same time and on a wide I/O interface. The system includes a memory device coupled to the bridge device via the wide I/O interface. The memory device includes an edge-triggered circuit having a first input port, a first clock port, and a first output port. The edge-triggered circuit receives, at the first clock port, the strobe having a first edge and a second edge, receives, at the first input port, the control byte time-aligned with the first edge and the data byte time-aligned with the second edge, and passes, to the first output port, the control byte based on the first edge and the data byte based on the second edge. The memory device includes an inputs/outputs (I/O) decoder coupled to the first output port and that sends the control byte to a microcontroller and sends the data byte to memory cells.

An illustrative embodiment disclosed herein is a method including receiving, by a circuit, a strobe having a first edge and a second edge, receiving, by the circuit, a control byte time-aligned with the first edge and a data byte time-aligned with the second edge, identifying, by the circuit, the control byte based on the first edge and the data byte based on the second edge, sending, by the circuit, the control byte to a microcontroller, and sending, by the circuit, the data byte to memory cells.

BRIEF DESCRIPTION OF THE DRAWINGS

FIG. 3A depicts an example block diagram of an ATM C/A sequence, in accordance with some embodiments of the present disclosure.

FIG. 3B depicts an example block diagram of a packet, in accordance with some embodiments of the present disclosure.

FIG. 3C depicts an example block diagram of a prefix byte, in accordance with some embodiments of the present disclosure.

FIG. 3D depicts an example data structure, in accordance with some embodiments of the present disclosure.

FIG. 3E depicts an example data structure, in accordance with some embodiments of the present disclosure.

FIG. 4A depicts a timing diagram of a TM4 command cycle, in accordance with some embodiments of the present disclosure.

FIG. 5A is an example block diagram of a memory device, in accordance with some embodiments of the present disclosure.

DETAILED DESCRIPTION

Figure 1:
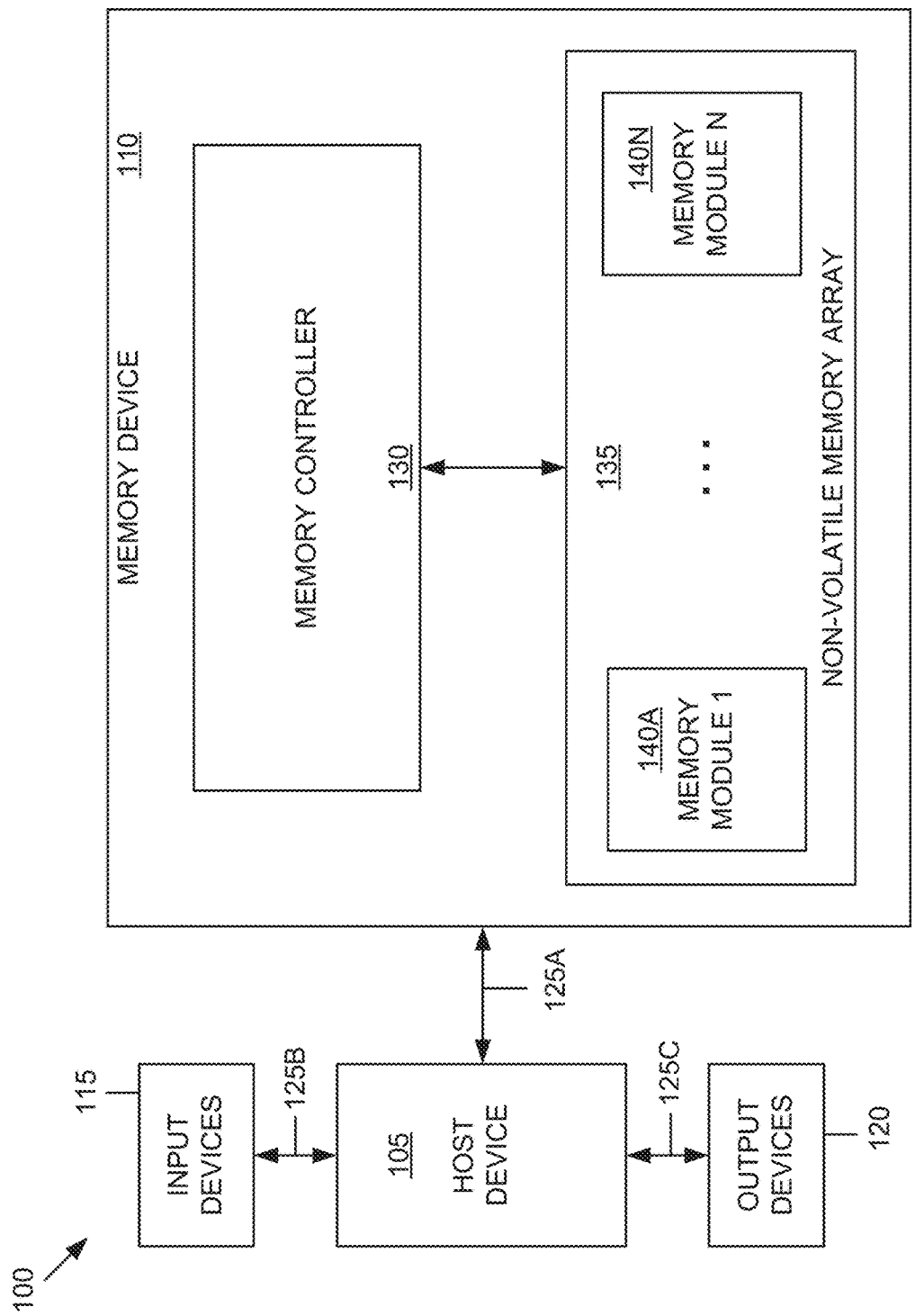
FIG. 1 depicts an example block diagram of a computing system, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that aspects of the present disclosure, as generally described herein, and illustrated in the figures, can be arranged, substituted, combined, and designed in a wide variety of different configurations, all of which are explicitly contemplated and make part of this disclosure.

To increase Toggle Mode interface speeds, a bridge device is used. The bridge device supports an 8-bit Toggle Mode interface on the controller side and a wide I/O Toggle Mode interface on the memory device side. The wide I/O Toggle Mode interface is an I/O interface that supports parallel transfer of more than 8 bits of data. In some embodiments, the wide I/O interface supports parallel transfer of 64 bits of data. However, a technical problem exists wherein the speed is limited by the slow exchange of the address and command cycles. The address and command cycle is limited by the speed of the write enable (WE) signal. Furthermore, when toggling between address bytes and command bytes, there is additional delay associated with the command latch enable (CLE) and the address latch enable (ALE) signals toggling. These limitations result in a lower throughput and a higher power consumption due to poor utilization of the wide I/O interface.

In some embodiments of the present disclosure, a new mode called Advanced Toggle Mode (ATM) is proposed to support faster command/address exchange while preserving backward compatibility to the legacy Toggle Mode (e.g., Toggle Mode Double Data Rate Version 4, also known as TM4) interface. In some embodiments, a data strobe (DQS) signal is used as a clock during the command-address phase, as well as during the data phase. In some embodiments, a command-address (CA) signal marks the command-address phase. In some embodiments, a prefix is added to command/address packets. In some embodiments, a command/address byte is decoded as a command or an address based on the prefix and passed to a microcontroller (e.g. an NAND embedded microcontroller).

In some embodiments, a Single Sign-On Minimization Indicator (SMI) bit is indicative of whether the command/address (e.g. or data) exchanged is inverted or not. The SMI reduces the maximum toggles on the bus to half of the bits of the bus, thus reducing power consumption. In some embodiments, a response (RESP) bit is indicative of whether the command/address byte has passed a cyclic redundancy check (CRC). The RESP bit is a power efficient mechanism for notifying the controller of bit errors.

In some embodiments, the ATM offers a technical solution to the technical problem of speeding up the command and address cycles for the wide I/O interface. In some embodiments, the DQS is at least twice the speed of the WE and the commands and addresses can be exchanged on either a rising or falling edge of the DQS signal. Furthermore, in some embodiments, there is no additional delay when toggling between command bytes and address bytes. Advantageously, the command and address phases from the controller side will be sent at a faster rate to the memory device. Overall throughput is increased, and I/O power is decreased due to better utilization of the interface bus.

Referring now to FIG. 1, an example block diagram of a computing system 100 is shown, in accordance with some embodiments of the present disclosure. The computing system 100 includes a host device 105 associated with a memory device 110. The host device 105 may be configured to receive input from one or more input devices 115, and provide output to one or more output devices 120. The host device 105 may be configured to communicate with the memory device 110, the input devices 115, and the output devices 120 via appropriate interfaces 125A, 125B, and 125C, respectively. The computing system 100 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

Although not shown, the host device 105 may include one or more processing units that may be configured to execute instructions for running one or more applications. In some embodiments, the instructions and data needed to run the one or more applications may be stored within the memory device 110. In such cases, the host device 105 may request the memory device 110 to retrieve the data and instructions, which may then at least temporarily be stored within a memory on the host device. The host device 105 may also be configured to store the results of running the one or more applications within the memory device 110. Thus, the host device 105 may be configured to request the memory device 110 to perform a variety of operations. For example, the host device 105 may request the memory device 110 to read data, write data, update or delete data, and/or perform management or other operations.

The memory device 110 includes a memory controller 130 that may be configured to read data from or write data to a non-volatile memory array 135. The non-volatile memory array 135 may include one or more memory devices such as memory devices 140A-140N. Each of the memory devices 140A-140N may include any of a variety of non-volatile memory types. For example, in some embodiments, one or more of the memory devices 140A-140N may include NAND flash memory cores. In other embodiments, one or more of the memory devices 140A-140N may include NOR flash memory cores, Static Random Access Memory (SRAM) cores, Dynamic Random Access Memory (DRAM) cores, Magnetoresistive Random Access Memory (MRAM) cores, Phase Control Memory (PCM) cores, Resistive Random Access Memory (ReRAM) cores, 3D memory cores, ferroelectric random-access memory (FeRAM) cores, and other types of memory cores that are suitable for use within the non-volatile memory array 135.

The memory devices 140A-140N may be individually and independently controlled by the memory controller 130. In other words, the memory controller 130 may be configured to communicate with each of the memory devices 140A-140N individually and independently. As discussed in greater detail below, the memory devices 140A-140N may remain in a standby state until the memory controller 130 desires to establish communication with one of the memory devices by generating a chip select or chip enable signal. The memory controller 130 may be configured as a logical block or circuitry that receives instructions from the host device 105 and performs operations in accordance with those instructions. For example, the memory controller 130 may be configured to read data from or write data to one or more of the memory devices 140A-140N. The memory controller 130 may be situated on the same die as the non-volatile memory array 135 or on a different die.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110 including the memory controller 130 and the non-volatile memory array 135, may include other hardware, software, and/or firmware components that are considered necessary or desirable in performing the functions described herein.

Figure 2A:
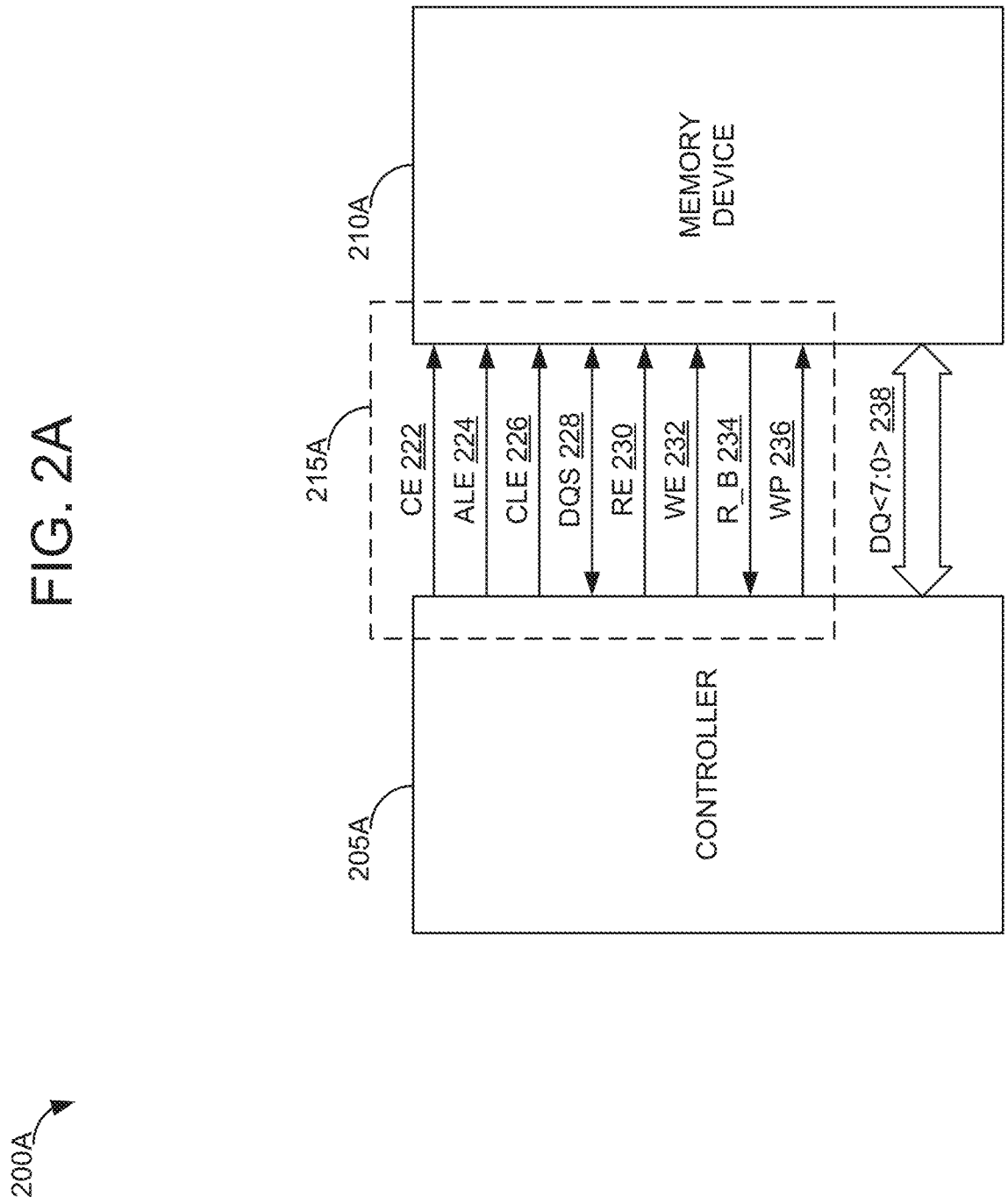
FIG. 2A depicts an example block diagram of a Toggle Mode version 4 (TM4) memory system, in accordance with some embodiments of the present disclosure.

Referring now to FIG. 2A, an example block diagram of a Toggle Mode version 4 (TM4) memory system 200A is shown, in accordance with some embodiments of the present disclosure. The memory system 200A includes a controller 205A (e.g., memory controller 130A) and a memory device 210A (e.g., memory device 140A) coupled to the controller 205A. TM4 control signals 215A and I/O signals are coupled between the controller 205A and the memory device 210A. The controller 205A and the memory device 210A support TM4 operation (e.g., TM4 mode). In TM4 operation, the TM4 control signals 215A include chip enable (CE) 222, address latch enable (ALE) 224, command latch enable (CLE) 226, strobe (DQS) 228, read enable (RE) 230, write enable (WE) 232, R_B 234, and write protect (WP) 236. In some embodiments, each control signal 215A is coupled on a dedicated line (e.g., a 1-bit bus). The inputs/outputs (I/O) signals include DQ<7:0> 238. In some embodiments, the DQ<7:0> 238 is coupled on a narrow I/O interface (e.g., a dedicated, 8-bit bidirectional I/O bus). The controller 205A drives all of the signals except for (a) the R_B 234, and (b) during a data read operation, the DQ<7:0> 238 and the DQS 228.

Figure 2B:
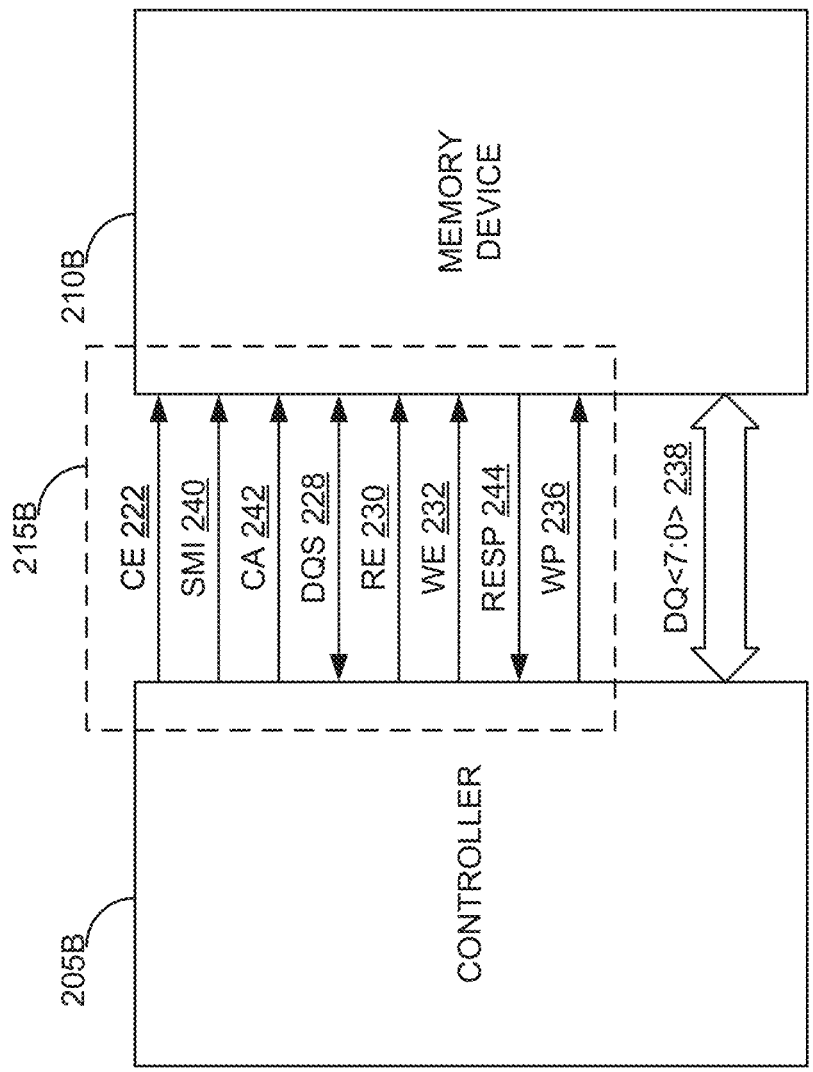
FIG. 2B depicts an example block diagram of an Advanced Toggle Mode (ATM) memory system, in accordance with some embodiments of the present disclosure.

Referring now to FIG. 2B, an example block diagram of an Advanced Toggle Mode (ATM) memory system 200B is shown, in accordance with some embodiments of the present disclosure. The memory system 200B includes a controller 205B (e.g., memory controller 130A) and a memory device 210B (e.g., memory device 140A) coupled to the memory device 210B. The controller 205B and the memory device 210B are similar to the controller 205A and the memory device 210A, respectively, with respect to FIG. 2A, except for differences described herein. The controller 205B and the memory device 210B supports ATM operation (e.g., ATM mode) and TM4 operation. In TM4 operation, TM4 control signals 215A, with respect to FIG. 2A, and I/O signals are coupled between the controller 205B and the memory device 210B. In ATM operation, ATM control signals 215B and I/O signals (e.g., the DQ<7:0> 238) are coupled between the controller 205B and the memory device 210B. The ATM control signals 215B include the TM4 control signals 215A with respect to FIG. 2A, except that, the ATM control signals 215B include a Single Sign-On Minimization Indicator (SMI) 240, a Command/Address Enable (CA) 242, and a Response (RESP) 244 instead of the ALE 224, the CLE 226, and the R_B 234. Stated another way, the SMI 240, the CA 242, and the RESP 244 are coupled on the ALE 224 line, the CLE 226 line, and the R_B 234 line, respectively.

Figure 2C:
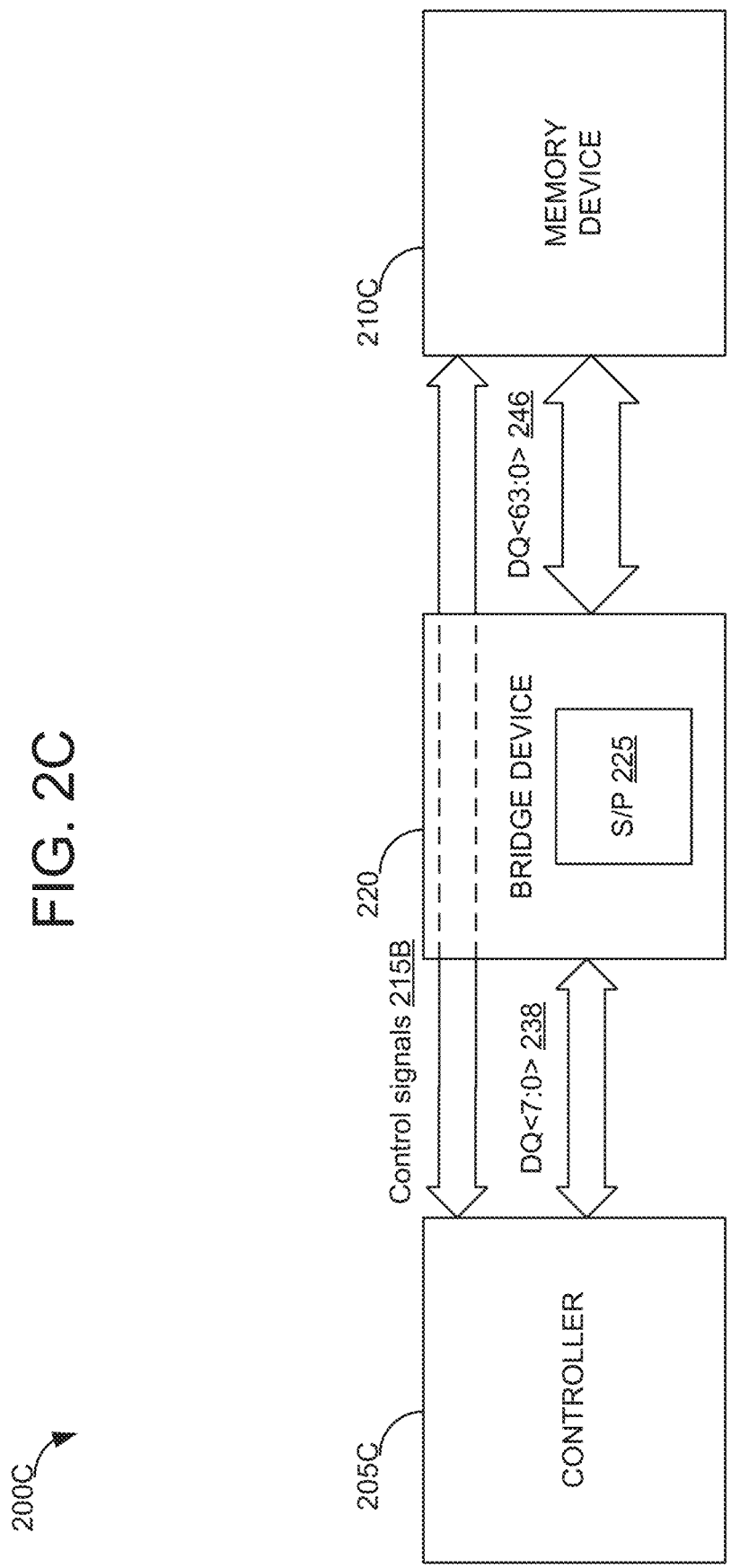
FIG. 2C depicts an example block diagram of an ATM memory system, in accordance with some embodiments of the present disclosure.

Referring now to FIG. 2C, an example block diagram of an ATM memory system 200C is shown, in accordance with some embodiments of the present disclosure. The memory system 200C includes a controller 205C, a memory device 210C, and a bridge device 220 coupled to the controller 205C and the memory device 210C. The controller 205C, the memory device 210C, and the bridge device 220 support ATM and TM4 operation. The controller 205C and the memory device 210C are similar to the controller 205B and the memory device 210B, respectively, with respect to FIG. 2B, except for differences described herein. ATM control signals 215B (e.g., or the TM4 signals 215A) and the I/O signals are coupled between the controller 205C and the bridge device 220, as well as between the bridge device 220 and the memory device 210C. The I/O signals coupled on a narrow I/O interface between the controller 205C and the bridge device 220 and include the DQ<7:0> 238. The I/O signals coupled on a wide I/O interface between the bridge device 220 and the memory device 210C and include multiple bytes (e.g., DQ<63:0> 246). In some embodiments, the wide I/O interface is a dedicated, 64-bit bidirectional I/O bus. In some embodiments, the multiple bytes can be an integer number of bytes (e.g. 16 bits, 32 bits, 64 bits, 128 bits, 256 bits), a fractional number of bytes, any power of 2 bits, or any other number of bits.

In some embodiments, the bridge device 220 receives, at different time instances, a first group of bytes from the controller 205C. For example, the bridge device 220 receives a first byte, DQ<7:0> 238A, at a first time instance, a second byte, DQ<7:0> 238B, at a second time instance, and so on. In some embodiments, the bridge device 220 sends a group of bytes, at a single time instance, to the memory device 210C. For example, the bridge device 220 sends the DQ<63:0> 246, at a single time instance.

In some embodiments, the bridge device includes a serial-to-parallel (S/P) circuit 225. The S/P circuit 225 can encode the first group of bytes to the second group of bytes. The S/P circuit 225 can determine whether the bridge device 220 has received a number of bytes satisfying a predetermined threshold. In some embodiments, the S/P circuit 225 stores a received byte in a cache. In some embodiments, the S/P circuit 225 counts a number of blocks written to in the cache, or a portion thereof. Each written to block can indicate an additional byte is received. In some embodiments, the S/P circuit 225 counts a number of edges of the DQS 228 received, sensed, or otherwise determined by the S/P circuit 225. Each edge can indicate that an additional byte is received. In some embodiments, responsive to determining that the number of bytes satisfies the predetermined threshold, the S/P circuit fetches the second group of bytes from the cache and sends the second group of bytes to the memory 210C. In some embodiments, upon sending the second group of bytes, the S/P circuit 225 flushes, or deletes, the cache, or the portion thereof. In some embodiments, upon sending the second group of bytes, the S/P circuit 225 deletes only the blocks corresponding with the second group of bytes.

Referring now to FIG. 3A, an example block diagram of an ATM C/A sequence 300A is shown, in accordance with some embodiments of the present disclosure. The ATM C/A sequence 300A includes a header byte (HDR) 305, packets 310A-310N (generally, packet(s) 310), and a cyclic redundancy check byte (CRC) 315. In some embodiments, the ATM C/A sequence 300A includes a minimum of 6-bytes. In some embodiments, the HDR 305 includes a count of command and address bytes. For example, if the ATM C/A sequence 300A includes N valid (e.g., C/A and/or prefix) bytes, the HDR 305 has a value of N−1. In some embodiments, the CRC 315 uses a CRC8 standard.

Referring now to FIG. 3B, an example block diagram of the packet 310 is shown, in accordance with some embodiments of the present disclosure. In some embodiments, each packet 310 includes a prefix byte 320 and one or more command/address bytes 325A-325G. Each command/address byte can be either a command byte or an address byte. In some embodiments, each byte of the packet 310A has a corresponding index. For example, the prefix byte 320 has an index of 7, the command/address byte 325A has an index of 6, and so on.

Referring now to FIG. 3C, an example block diagram of the prefix byte 320 is shown, in accordance with some embodiments of the present disclosure. The prefix byte 320 includes eight prefix bits: a last packet bit 335 and seven prefix bits 340A-340G (generally, prefix bit(s) 340). Each of the prefix bits 340 indicates a C/A type (e.g., command or address) of a corresponding command/address byte. In some embodiments, each bit of the prefix byte 320 has a corresponding index. For example, the last packet bit 335 has an index of 7, the prefix bit 340A has an index of 6, and so on.

A prefix bit 340 with a first value (e.g., "1") indicates that a corresponding command/address byte 325 is a command byte, and a prefix bit 340 with a second value (e.g., "0") indicates that the corresponding command/address byte 325 is an address byte. A last packet bit 335 with a first value (e.g., "1") indicates that a corresponding packet 310 (e.g. a packet 310 in which the last packet prefix bit 335 is located) is a last packet in the ATM C/A sequence 300A, and a last packet prefix bit 335 with a second value (e.g., "0") indicates that the corresponding packet 310 is not the last packet in the ATM C/A sequence 300A.

Referring now to FIG. 3D, an example prefix data structure 350 is shown, in accordance with some embodiments of the present disclosure. In some embodiments, the data structure 350 maps the indices of the packet 310A to corresponding indices of the prefix byte, respectively. Thus, a prefix bit (340A) having a first prefix index (e.g. 6) that maps to a first packet index (e.g. 6) whether a command/address byte (325A) having the first packet index is a command byte or an address byte. In some embodiments, the data structure 350 is a look-up table (LUT). In some embodiments, the data structure 350 is stored in memory cells of an ATM memory device (e.g., 210B or 210C), a cache of a microcontroller of the ATM memory device, a cache of an ATM controller (e.g., 205B or 205C), or in another memory or storage location. Referring now to FIG. 3E, an example prefix data structure 360 is shown, in accordance with some embodiments of the present disclosure. In some embodiments, the data structure 350 maps a byte count value to corresponding indices of the prefix byte, respectively. In some embodiments, the byte count value is determined by a counter circuit that counts a number of DQS 228 edges. In some embodiments, the number of DQS 228 edges equals the byte value count. In some embodiments, the number of DQS 228 edges has a linear relationship with the byte value count.

In some embodiments, an ATM data sequence includes a number of (e.g., write or read) data bytes. In some embodiments, the ATM data sequence is similar to the TM4 data sequence. In some embodiments, the ATM data sequence does not include a HDR 305 and a CRC 315.

Referring now to FIG. 4A, a timing diagram of a TM4 command cycle 400A is shown, in accordance with some embodiments of the present disclosure. The command byte 325A on the DQ<7:0> 238 line is latched, clocked activated, transmitted, passed, or otherwise processed, at instance 405, on the rising edge of the WE 226 with the CLE 226 asserted (e.g., high, high signal, high level, voltage level of voltage supply, "1," and so on) and the ALE 224 de-asserted (e.g., low, low signal, low level, voltage level of ground, "0," and so on). The command byte 325B is latched on the next rising edge. The write cycle time, $t_{WC}$, determines a time two consecutive rising edges of the WE 226. In some embodiments, the time between latching the command byte 325A and latching the command byte 325B is equal, or substantially equal, to the $t_{WC}$. In some embodiments, the $t_{WC}$ is 25 ns. In some embodiments, a timing diagram of a TM4 address cycle is similar to the timing diagram of the TM4 command cycle 400A except for the differences described herein. During the address cycle, the CLE 226 is de-asserted and the ALE 224 is asserted.

Figure 4B:
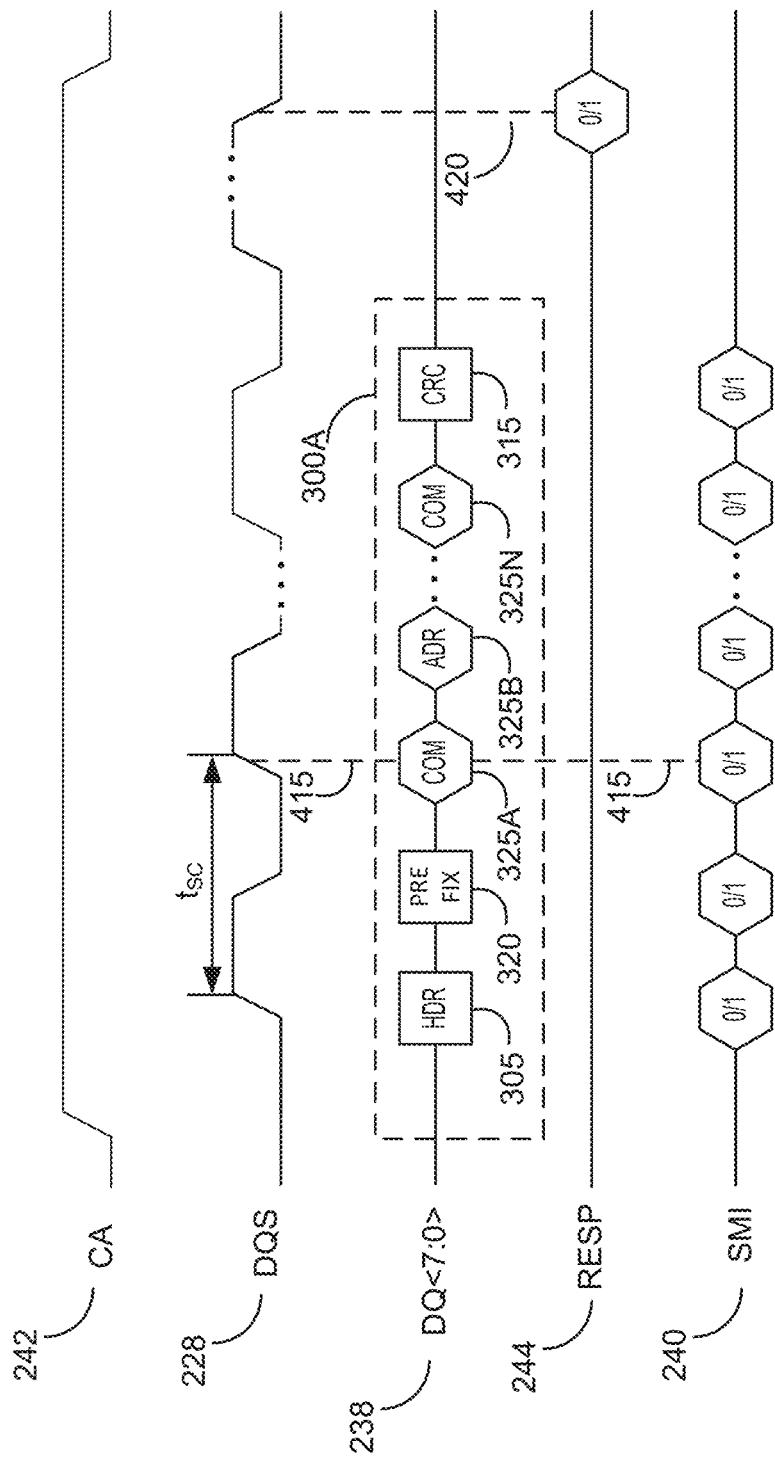
FIG. 4B, a timing diagram of an ATM command/address cycle, in accordance with some embodiments of the present disclosure.

Referring now to FIG. 4B, a timing diagram of an ATM command/address cycle 400B is shown, in accordance with some embodiments of the present disclosure. During the command/address cycle 400B, the CA 242 is asserted. A first command/address byte 325A (e.g., a command byte or an address byte) on the DQ<7:0> 238 line is latched, clocked, transmitted activated, passed or otherwise processed, at instance 415, on an edge (e.g., rising or falling) of the DQS 228. In other words, the first command/address byte 325A can be latched on a rising edge of the DQS 228 and a second command/address byte 325B can be latched on a next falling edge of the DQS 228. Thus, two command/address bytes can be latched per a DQS 228 cycle. The strobe cycle time, $t_{SC}$, determines a time two consecutive rising edges of the DQS 228. In some embodiments, the time between latching the command/address byte 325A and latching the command/address byte 325B is equal, or substantially equal, to half of the $t_{SC}$. In some embodiments, the $t_{WC}$ is 10 ns. In some embodiments, each command/address byte 325 is decoded to a command byte or an address byte based on a corresponding prefix bit 340. In some embodiments, the ATM C/A sequence 300A, including the HDR 305, each of the prefix bytes 320, each of the command/address bytes 325, and the CRC byte 315, can be latched on a corresponding edge of the DQS 228.

The ATM command/address cycle 400B includes a command/address response. The controller 205B drives the DQS 228 for N number of cycles for a CRC check to complete inside the ATM memory device. The RESP 244 is latched, at instance 420, on a rising or falling edge of the DQS 228. A RESP 244 with a first value (e.g., "1") indicates that there is no CRC error. A RESP 244 with a second value (e.g., "0") indicates that there is a CRC error. The RESP 244 is kept asserted until a CA 242 falling edge is detected.

The SMI 240 indicates whether DQ<7:0> 238 is inverted or not. The bus inversion is used to reduce simultaneous switching the data lines based on the previous state of the DQ<7:0> 238 line. For example, if a first byte of the DQ<7:0> 238 is 8'b00000000, the first byte is latched on a first DQS 228 edge, and a second byte of the DQ<7:0> 238 is to be 8'b11111111, then an inverted second byte of the DQ<7:0> 238 is latched on a second DQS 228 edge, and the corresponding SMI 240 has a value of "1." The SMI 240 can toggle from a first value corresponding to a first byte to a second value corresponding to a second byte.

During TM4 data write cycles, the data byte on the DQ<7:0> 238 line is latched on an edge of the DQS 228 signal. The ATM data cycles are similar to the TM4 data cycles except for the differences described herein. During the ATM data cycles, the SMI 240 (e.g., on the ALE 224 line) indicates whether corresponding data on the DQ<7:0> 228 is inverted.

Referring now to FIG. 5A, an example block diagram of the memory device 210B is shown, in accordance with some embodiments of the present disclosure. The memory device includes the edge-triggered circuit (e.g. flip-flop 505), an I/O decoder 500, memory cells 520, and a microcontroller 525. The I/O decoder 500 includes a multiplexer (DEMUX) 510, a control decoder 515A, and an SMI decoder 515B. In some embodiments, the DQ<7:0> 238 byte is received at an input port of the flip-flop 505, and the DQS 228 is received at a clock port of the flip-flop 505. In some embodiments, the DQ<7:0> 238 byte is time-aligned with an edge (e.g., a rising edge) of the DQS 228, meaning that the edge is detected by the flip-flop 505 at a time that the flip-flop 505 is receiving the DQ<7:0> 238 byte at the input port (e.g., with a requisite settle time and hold time for the DQ<7:0> 238 byte). In some embodiments, the flip-flop 505 passes the DQ<7:0> 238 byte to an output port in response to the edge of the DQS 228 being detected by the flip flop 505.

The DQ<7:0> 238 byte is received at an input port of the DEMUX 510 and a CA 242 bit is received at the selector port of the DEMUX 510. In some embodiments, the CA 242 bit is time-aligned with the edge of the DQS 228 edge. Responsive to the CA 242 (e.g., bit) receiving a first level (e.g., being de-asserted), which is an indication that the DQ<7:0> 238 byte is a data byte, in some embodiments, the data byte is passed to an output port y0 of the DEMUX 510, which is coupled to an input port of a SMI decoder 515B. Responsive to the CA 242 receiving a second level (e.g., being asserted), which is an indication that the DQ<7:0> 238 byte is a control byte (e.g., a command byte, an address byte, or a prefix byte), in some embodiments, the control byte is passed to an output port y1 of the DEMUX 510, which is coupled to an input port of the control decoder 515A.

Figure 6:
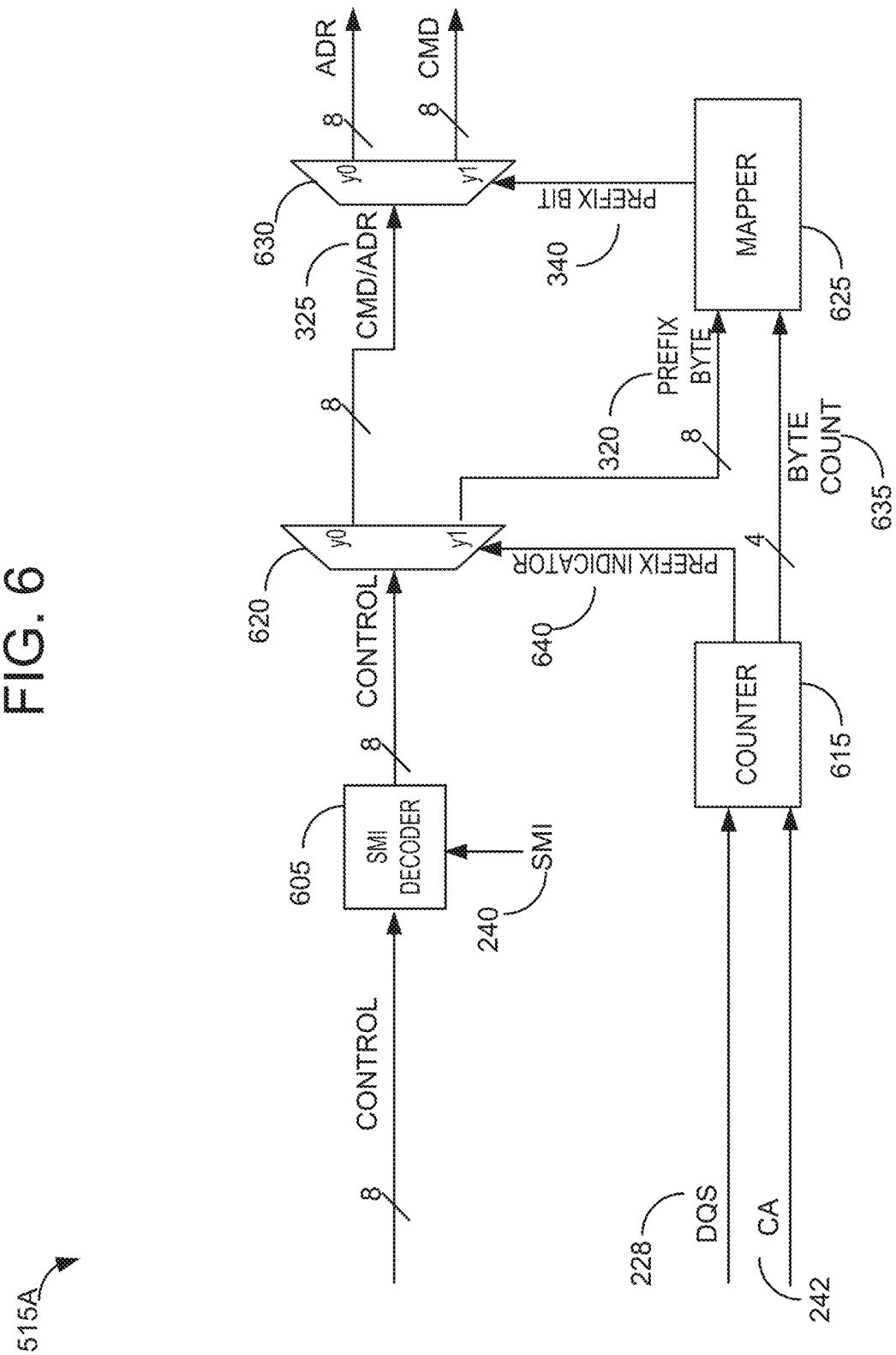
FIG. 6 is an example block diagram of a control decoder, in accordance with some embodiments of the present disclosure.
Figure 7:
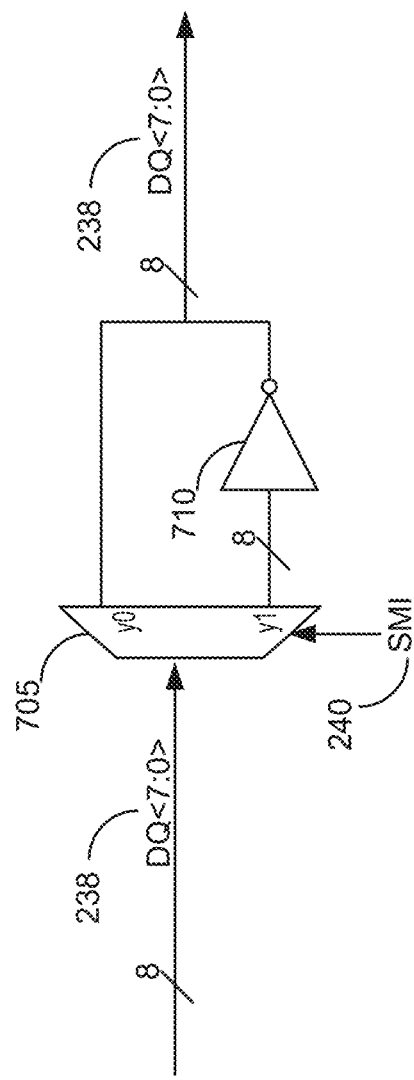
FIG. 7 is an example block diagram of a Single Sign-On Minimization Indicator (SMI) decoder, in accordance with some embodiments of the present disclosure.

Referring now to FIG. 6, an example block diagram of a control decoder 515A is shown, in accordance with some embodiments of the present disclosure. The control decoder 515A includes an SMI decoder 605, a counter 615, a DEMUX 620, a mapper 625, and a DEMUX 630. Referring now to FIG. 7, an example block diagram of an SMI decoder 605 is shown, in accordance with some embodiments of the present disclosure. In some embodiments, the SMI decoder 605 represents a selectable inverter. In some embodiments, the DQ<7:0> 238 (e.g., the control byte) is received at an input port of the DEMUX 705 and an SMI 240 (e.g., bit) is received at the selector port of the DEMUX 705. In some embodiments, the SMI 240 is time-aligned with the edge of the DQS 228.

Responsive to the SMI 240 having a first value (e.g., de-asserted), in some embodiments, the control byte is passed to an output port y0 of the DEMUX 705, which is coupled to an input port of the DEMUX 620 (or, in some embodiments, a buffer coupled to the input port of the DEMUX 620). Responsive to the SMI 240 having a second value (e.g., asserted), in some embodiments, the control byte is passed to an output port y1 of the DEMUX 705, which is coupled to the inverter 710. The inverter 710 inverts a byte at its input port and sends it to its output port. In some embodiments, the inverter 710 output is coupled to the input port of the DEMUX 620. Thus, the control byte is non-inverted if passed to y0 and inverted, by the inverter 710, if passed to y1.

In some embodiments, the counter 615 receives the DQS 228 at a first input port. In some embodiments, the counter 615 counts a number of edges of the DQS 228. In some embodiments, the counter 615 receives the CA 242 at a second input port. In some embodiments, the counter 615 counts only when the CA 242 is asserted. In some embodiments, the counter 615 sends, to a first output port, a byte count 635 based on counting the number of edges of the DQS 228. In some embodiments, the byte count 635 is equal to the number of edges. In some embodiments, the byte count 635 is a linear function of the number of edges (e.g., one less than the number of edges). In some embodiments, the byte count 635 is four bits. In some embodiments, the counter 615 resets the byte count 635 to a predetermined value (e.g., "0") when the CA 242 is de-asserted. In some embodiments, the first output port of the counter 615 is coupled to a second input of the mapper 625. In some embodiments, the counter 615 sends, to a second output port, a prefix indicator bit 640. The prefix indicator bit indicates whether the byte count equals a predetermined first number (e.g., "1"). In some embodiments, the second output port of the counter 615 is coupled to the selector port of the DEMUX 620.

In some embodiments, the DEMUX 620 receives the control byte at an input port. In some embodiments, the DEMUX 620 receives the prefix indicator bit 640 at a selector port. In some embodiments, responsive to prefix indicator bit 640 being a first level (e.g., asserted), which is an indication that the control byte is a prefix byte 320, the DEMUX 620 passes the prefix byte 320 to an output port y1 of the DEMUX 620 that is coupled to a first input port of the mapper 625, in some embodiments. In some embodiments, responsive to prefix indicator bit 640 being a second level (e.g., de-asserted), which is an indication that the control byte is command/address byte 325 (e.g., command byte or an address byte), the DEMUX 620 passes the command/address byte 325 to the output port y0 of the DEMUX 620 that is coupled to an input port of the DEMUX 630, in some embodiments.

In some embodiments, the mapper 625 receives the prefix byte 320 at a first input port. In some embodiments, the mapper 625 receives the byte count 635 at a second input port. In some embodiments, the mapper 625 retrieves prefix data structure 360, with respect to FIG. 3E, from a memory or storage location. In some embodiments, the mapper 625 maps the byte count 635 to a prefix index. In some embodiments, the mapper 625 fetches a prefix bit 340 (e.g., prefix bit 340A) located at the prefix index of the prefix byte 320. In some embodiments, the mapper 625 sends the prefix bit 340 to the selector port of the DEMUX 630.

In some embodiments, the DEMUX 630 receives the command/address byte 325 at an input port. In some embodiments, the DEMUX 630 receives the prefix bit 340 at a selector port. Responsive to the prefix bit 340 having a first value (e.g., de-asserted), in some embodiments, which is an indication that the command/address byte 325 is an address byte, the address byte is passed to an output port y0 of the DEMUX 630 that is coupled to a first portion of the microcontroller 525 that receives addresses, in some embodiments. Responsive to the prefix bit 340 having a second value (e.g., asserted), in some embodiments, which is an indication that the command/address byte 325 is a command byte, the command byte is passed to an output port y1 of the DEMUX 630 that is coupled to a second portion of the microcontroller 525 that receives commands, in some embodiments.

Referring back to FIG. 5A, the microcontroller 525 receives address bytes and command bytes from the respective ports of the control decoder 515A. Each address and command byte is executed or otherwise processed by the microcontroller 525. In some embodiments, the address indicates where to store or fetch corresponding data in memory cells 520, and the command is executed on corresponding data in the memory cells 520. In some embodiments, a next command is stored in a pre-fetch command buffer 530 within the microcontroller 525. Upon execution, by the microcontroller 525, of a previous command, the pre-fetch command buffer 530 transfers the next command to the microcontroller 525. Thus, pre-fetching is happening when execution of the previous command is occurring, and thus, fetching time for the next command becomes zero seconds.

Figure 8:
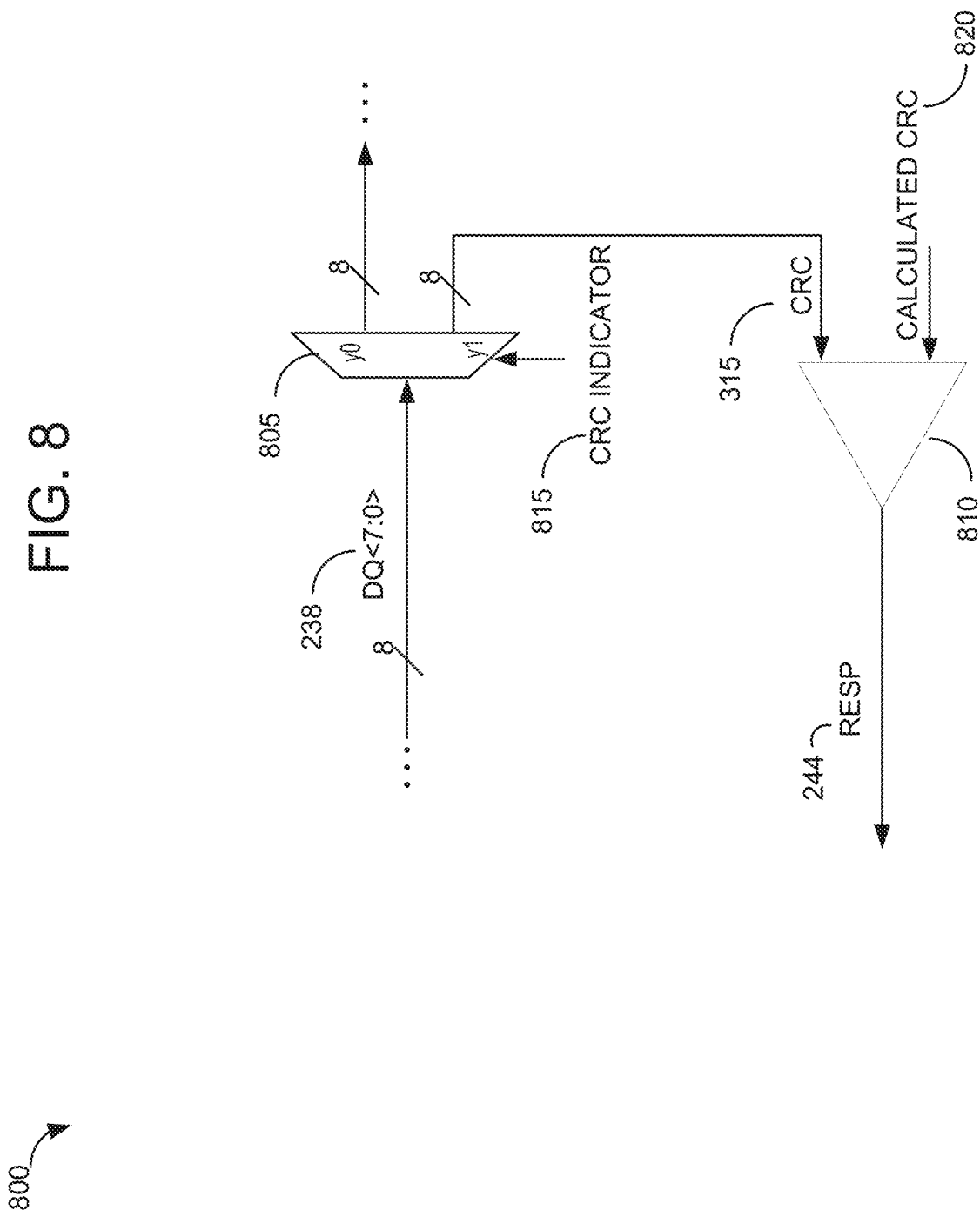
FIG. 8 is an example block diagram of a cyclic redundancy check (CRC) circuit, in accordance with some embodiments of the present disclosure.

Referring now to FIG. 8, a cyclic redundancy check (CRC) circuit 800 is shown, in accordance with some embodiments of the present disclosure. The CRC circuit 800 includes a DEMUX 805 and a comparator 810. The DQ<7:0> 238 byte is received at the input port of the DEMUX 805 and a CRC indicator bit 815 is received at the selector port of the DEMUX 620. In some embodiments, the CRC indicator bit 815 indicates whether a last packet is complete. The CRC indicator 815 can be derived from the last packet bit 335. In some embodiments, the CRC indicator bit 815 is asserted when the last packet bit 335 from a previous byte is asserted and the last packet bit 335 from a current byte is not asserted. Responsive to the CRC indicator bit 815 having a first level (e.g., de-asserted), in some embodiments, the DQ<7:0> 238 is passed to an output port y0 of the DEMUX 805. Responsive to the CRC indicator bit 815 having a second value (e.g., asserted), in some embodiments, the DEMUX 805 receives indication that the DQ<7:0> 238 is the CRC byte 315, and the DEMUX 805 passes the CRC byte 315 to an output port y1 of the DEMUX 805, which is coupled to a first port of the comparator 810.

In some embodiments, a second port of the comparator 810 receives a calculated CRC 820. In some embodiments, the calculated CRC 820 is calculated by a processor or circuit associated with the memory device 210B. The comparator 810 determines whether the CRC byte 315 matches the calculated CRC 820. Responsive to the comparator 810 determining that the CRC byte 315 matches the calculated CRC 820, in some embodiments, the comparator 810 generates a first value (e.g., "1") and sends the RESP 244 having the first value to the controller 205B. Responsive to the comparator 810 determining that the CRC byte 315 does not match the calculated CRC 820, in some embodiments, the comparator 810 generates a second value (e.g., "0") and sends the RESP 244 having the first value to the controller 205B.

In some embodiments, the CRC circuit 800 is located in between the flip-flop 505 and the DEMUX 510. In some embodiments, the output port of the flip-flop 505 couples to the input port of the DEMUX 805. In some embodiments, the output port y0 of the DEMUX 805 couples to the input port of the DEMUX 510.

In some embodiments, the flip-flop 505 includes eight single flip-flops and each single flip-flop receives and passes a corresponding bit of the DQS<7:0> 238 byte. In some embodiments, each of the DEMUXes 510, 620, 630, 705, and 805 includes eight single DEMUXes and each single DEMUX may pass a corresponding bit of the DQ<7:0> 238 byte to either y0 or y1. In some embodiments, the inverter 710 includes eight single inverters and each single inverter may invert a corresponding bit of the DQ<7:0> 238 byte. In some embodiments, the comparator 810 includes eight single comparator and each single comparator may compare a corresponding bit of the CRC 315 to a corresponding bit of the calculated CRC 820. The outputs of the eight single comparators may be ANDed together.

Referring back to FIG. 5A, the SMI decoder 515B receives a data byte from the output port y0 of the DEMUX 510. In some embodiments, the SMI decoder 515B is an instance of the SMI decoder 605 with respect to FIG. 7. In some embodiments, the SMI decoder 515B sends the data byte to the memory cells 520. In some embodiments, circuits or processors associated with the memory cells 520 store, or write, the data byte received from the SMI decoder 515B. In some embodiments, a path from the input of the memory device 210B to the memory cells 520 is bi-directional such that the controller 205B can read data stored in the memory cells 520. In some embodiments, the memory cells 520 receive command and address bytes from the microcontroller 525.

Figure 5B:
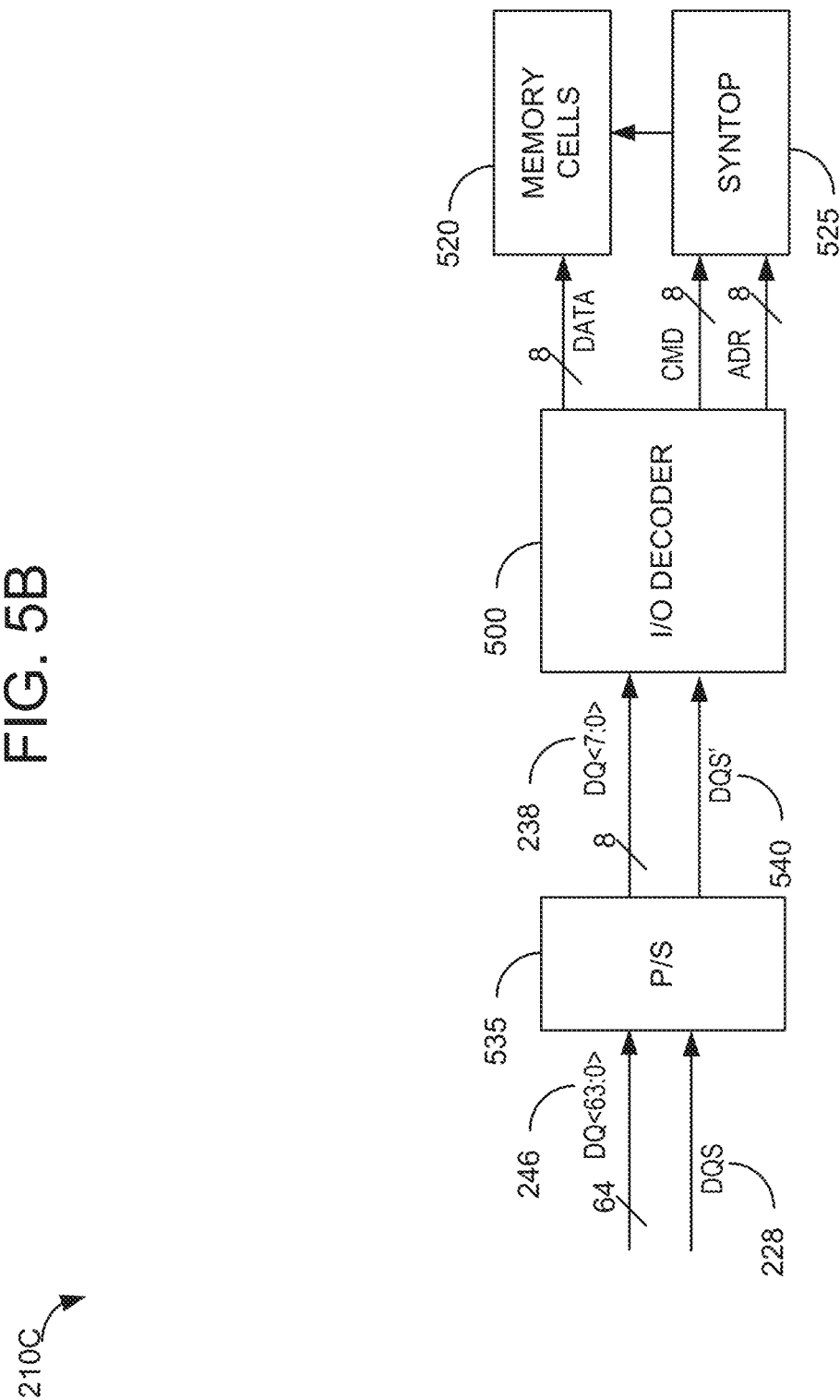
FIG. 5B is an example block diagram of a wide I/O interface memory device, in accordance with some embodiments of the present disclosure.

Referring now to FIG. 5B, an example block diagram of the wide interface memory device 210C is shown, in accordance with some embodiments of the present disclosure. In some embodiments, the memory device 210C similar to the memory device 210B except for the differences described herein. The memory device 210C includes a parallel-to-serial (P/S) circuit 535, the I/O decoder 500 with respect to FIG. 5A, the memory cells 520 with respect to FIG. 5A, and the microcontroller 525 with respect to FIG. 5A. The P/S circuit 535 receives the second group of bytes (e.g., the DQ<63:0> 246) time aligned with a DQS 228 edge. The P/S circuit 535 can decode the second group of bytes to the first group of bytes (e.g. a number of discrete DQ<7:0> 238 bytes). In some embodiments, the P/S circuit 535 stores the decoded DQ<7:0> 238 bytes in a cache, or a portion thereof. In some embodiments, the P/S circuit generates a DQS' 540. In some embodiments, the P/S circuit fetches a DQ<7:0> 238 byte from the cache and sends the DQ<7:0> 238 byte to the I/O decoder. In some embodiments, the DQ<7:0> 238 is time-aligned with the DQS' 540. In some embodiments, upon sending the first group of bytes, the P/S circuit 535 flushes, or deletes, the cache, or the portion thereof. In some embodiments, upon sending the first group of bytes, the P/S circuit 535 deletes only the blocks corresponding with the first group of bytes.

Figure 9:
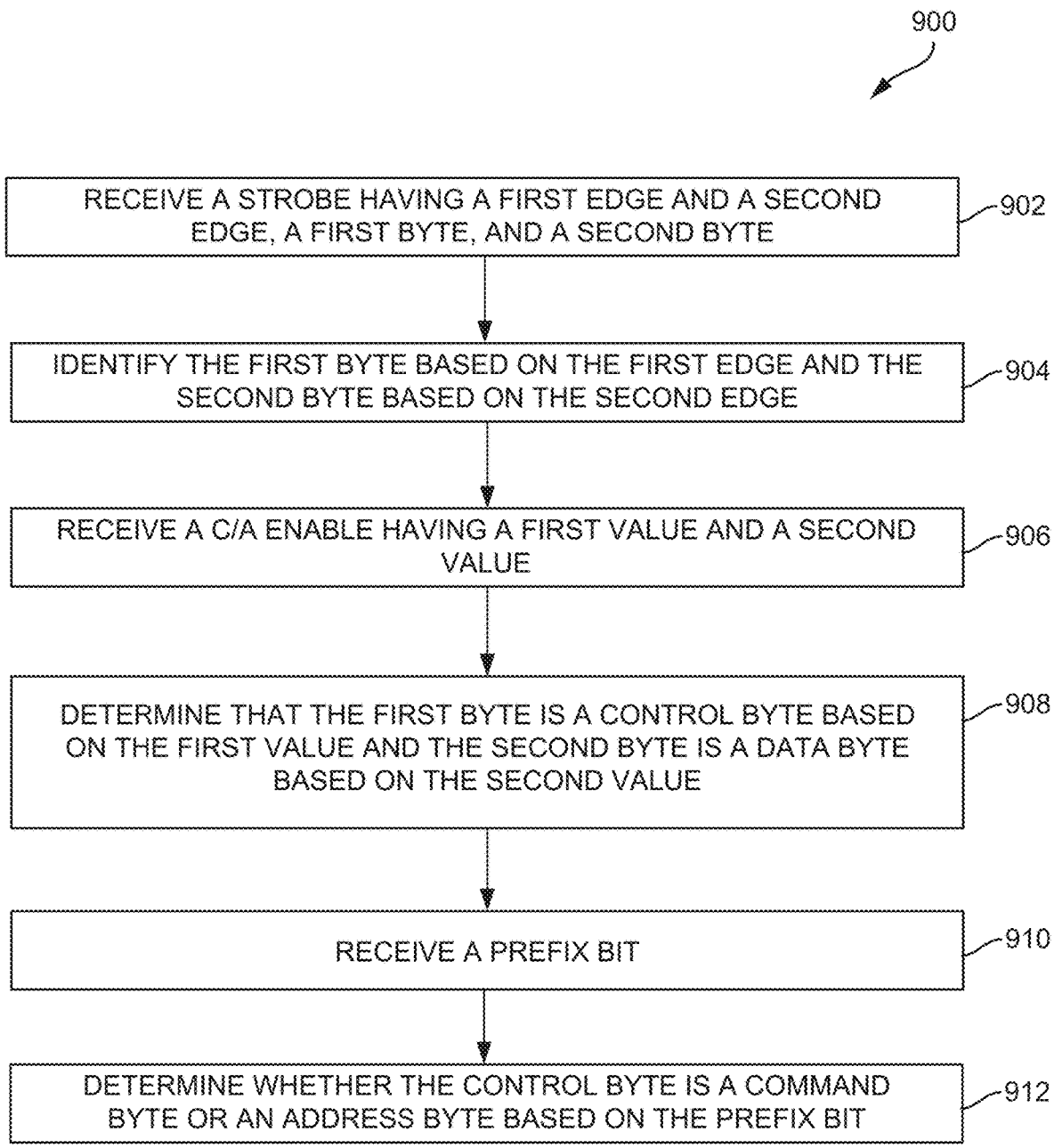
FIG. 9 depicts an example flow diagram of a process 900 for decoding one or more bytes, in accordance with some embodiments of the present disclosure.

FIG. 9 depicts an example flow diagram of a process 900 for decoding one or more bytes, in accordance with some embodiments of the present disclosure. Additional, fewer, or different operations may be performed in the process 900 depending on the embodiment. The process 900 may be performed by a memory device such as the memory device 210B or 210C, or one or more circuits thereof. The memory device receives a strobe, such as the DQS 228, having a first edge and a second edge, a first byte, such as a first DQ<7:0> 238, time-aligned with the first edge, and a second byte, such as a second DQ<7:0> 238, time-aligned with the second edge (902). The memory device identifies, validates, latches, clocks, passes, or otherwise processes the first byte based on the first edge and the second byte based on the second edge (904).

The memory device receives a command/address (CA) enable bit, such as the CA 242, having a first level time-aligned with the first edge and a second level time-aligned with the second edge (906). The memory device determines that the first byte is a control byte (e.g., a command/address byte 325A or a prefix byte 320) and the second byte is a data byte (908). In some embodiments, the first level indicates that the first byte is a control byte. In some embodiments, the second level indicates that the second byte is a data byte. In some embodiments, the memory device sends the first byte to a first path (e.g., to a control byte decoder and/or the microcontroller) based on the first level and the second byte to a second path (e.g., the memory cells).

The memory device receives a first prefix bit, such as the prefix bit 340A (910). The memory device determines whether the first byte (e.g., the control byte) is a command byte or an address byte based on the first prefix bit (912). In some embodiments, the memory device sends the first byte to a command portion of the microcontroller responsive to the first prefix bit having a first value. In some embodiments, the memory device sends the first byte to an address portion of the microcontroller responsive to the first prefix bit having a second value. In some embodiments, the memory device determines the first prefix bit by mapping a first index or count to a second index. The memory device can look up the first prefix bit at the second index of a prefix byte. In some embodiments, the memory device can determine the first index or count by counting a number of strobe edges. In some embodiments, the memory device can receive an SMI bit, such as the SMI 240, time-aligned with the first edge and having a first value. In some embodiments, the memory device can determine whether to invert the first byte based on the first value.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A circuit comprising:
   an edge-triggered flip-flop having a first input port, a first clock port, and a first output port and that:
      receives, at the first clock port, a strobe having a first edge and a second edge;
      receives, at the first input port, a control byte time-aligned with the first edge and a data byte time-aligned with the second edge; and
      passes, to the first output port, the control byte based on the first edge and the data byte based on the second edge; and
   an inputs/outputs (I/O) decoder coupled to the first output port and that:
      sends the control byte to a microcontroller; and
      sends the data byte to memory cells.

2. The circuit of claim 1, wherein the I/O decoder comprises a first demultiplexer (demux) having a second input port coupled to the first output port, a first selector port, a data output port coupled to the memory cells, and a control output port coupled to the microcontroller, wherein the first demux:

receives, at the second input port, the control byte and the data byte;

receives, at the first selector port, a command/address (CA) enable having a first level time-aligned with the first edge and a second level time-aligned with the second edge;

sends the control byte to the control output port based on the first level; and sends the data byte to the data output port based on the second level.

3. The circuit of claim 1, wherein the I/O decoder comprises a first demux having a second input port coupled to the first output port, a first selector port, a command output port coupled to a command portion of the microcontroller, and an address output port coupled to an address portion of the microcontroller, wherein the first demux:

receives, at the second input port, the control byte;

receives, at the first selector port, a first prefix bit;

responsive to the first prefix bit having a first value, sends the control byte to the command output port; and responsive to the first prefix bit having a second value, sends the control byte to the address output port.

4. The circuit of claim 1, wherein the circuit further comprises a selectable inverter having a second input port coupled to the first output port, a first selector port, a non-inverted output port, an inverted output port, wherein the selectable inverter:

receives, at the second input port, the control byte;

receives, at the selector port, an SMI bit time-aligned with the first edge and having a first value; and determines whether to invert the control byte based on the first value.

5. The circuit of claim 1, wherein the circuit further comprises a comparator that:

receives a transmitted cyclic redundancy check (CRC) byte;

receives a calculated CRC byte;

responsive to determining that the transmitted CRC byte matching the calculated CRC byte, sends, to a controller coupled to the circuit, a first response bit indicating that the transmitted CRC byte matches the calculated CRC byte; and responsive to determining that the transmitted CRC byte is different than the calculated CRC byte, sends, to the controller, a second response bit indicating that the transmitted CRC byte is different than the calculated CRC byte.

6. The circuit of claim 3, wherein the I/O decoder further comprises a mapper coupled to the first demux, wherein the mapper:

receives a prefix byte including, at a first index of the prefix byte, the first prefix bit;

receives a byte count corresponding to the control byte;

maps the byte count to the first index; and sends the first prefix bit to the first demux.

7. The circuit of claim 3, wherein the circuit receives the first prefix bit and the control byte at a same time and on a wide I/O interface.

8. The circuit of claim 6, wherein the I/O decoder further comprises a counter coupled to the mapper, wherein the counter:

counts a number of edges of the strobe;

determines the byte count based on counting the number of edges of the strobe; and sends the byte count to the mapper.

9. A system comprising:

a controller that generates and sends a first plurality of bytes including a command byte, a second plurality of bytes including a data byte, and a strobe;

a bridge device coupled to the controller via a narrow I/O interface and that:

receives each byte of the first plurality of bytes at a different time and on the narrow I/O interface; and sends the first plurality of bytes at a same time and on a wide I/O interface; and a memory device coupled to the bridge device via the wide I/O interface and comprising:

an edge-triggered circuit having a first input port, a first clock port, and a first output port and that:

receives, at the first clock port, the strobe having a first edge and a second edge;

receives, at the first input port, the control byte time-aligned with the first edge and the data byte time-aligned with the second edge; and passes, to the first output port, the control byte based on the first edge and the data byte based on the second edge; and an inputs/outputs (I/O) decoder coupled to the first output port and that:

sends the control byte to a microcontroller; and sends the data byte to memory cells.

10. The system of claim 9, wherein the I/O decoder comprises a first demultiplexer (demux) having a second input port coupled to the first output port, a first selector port, a data output port coupled to the memory cells, and a control output port coupled to the microcontroller, wherein the first demux:

receives, at the second input port, the control byte and the data byte;

receives, at the first selector port, a command/address (CA) enable having a first level time-aligned with the first edge and a second level time-aligned with the second edge;

sends the control byte to the control output port based on the first level; and sends the data byte to the data output port based on the second level.

11. The system of claim 9, wherein the I/O decoder comprises a first demux having a second input port coupled to the first output port, a first selector port, a command output port coupled to a command portion of the microcontroller, and an address output port coupled to an address portion of the microcontroller, wherein the first demux:

receives, at the second input port, the control byte;

receives, at the first selector port, a first prefix bit;

responsive to the first prefix bit having a first value, sends the control byte to the command output port; and responsive to the first prefix bit having a second value, sends the control byte to the address output port.

12. The system of claim 9, wherein the memory device further comprises a selectable inverter having a second input port coupled to the first output port, a first selector port, a non-inverted output port, an inverted output port, wherein the selectable inverter:

receives, at the second input port, the control byte;

receives, at the selector port, an SMI bit time-aligned with the first edge and having a first value; and determines whether to invert the control byte based on the first value.

13. The system of claim 9, wherein the memory device further comprises a comparator that:
  receives a transmitted cyclic redundancy check (CRC) byte;
  receives a calculated CRC byte;
  responsive to determining that the transmitted CRC byte matching the calculated CRC byte, sends, to the bridge device, a first response bit indicating that the transmitted CRC byte matches the calculated CRC byte; and
  responsive to determining that the transmitted CRC byte is different than the calculated CRC byte, sends, to the controller, a second response bit indicating that the transmitted CRC byte is different than the calculated CRC byte.

14. The system of claim 11, wherein the I/O decoder further comprises a mapper coupled to the first demux, wherein the mapper:
  receives a prefix byte including, at a first index of the prefix byte, the first prefix bit;
  receives a byte count corresponding to the control byte;
  maps the byte count to the first index; and
  sends the first prefix bit to the first demux.

15. The system of claim 11, wherein the memory device receives the first prefix bit and the control byte at a same time and on the wide I/O interface.

16. The system of claim 14, wherein the I/O decoder further comprises a counter coupled to the mapper, wherein the counter:
  counts a number of edges of the strobe;
  determines the byte count based on counting the number of edges of the strobe; and
  sends the byte count to the mapper.

17. A method comprising:
  receiving, by a circuit, a strobe having a first edge and a second edge;
  receiving, by the circuit, a control byte time-aligned with the first edge and a data byte time-aligned with the second edge;
  identifying, by the circuit, the control byte based on the first edge and the data byte based on the second edge;
  sending, by the circuit, the control byte to a microcontroller; and
  sending, by the circuit, the data byte to memory cells.

18. The method of claim 17, further comprising:
  receiving, by the circuit, a command/address (CA) enable having a first level time-aligned with the first edge and a second level time-aligned with the second edge;
  sending, by the circuit, the control byte to the microcontroller based on the first level; and
  sending, by the circuit, the data byte to the memory cells based on the second level.

19. The method of claim 17, further comprising:
  receiving, by the circuit, a first prefix bit;
  responsive to the first prefix bit having a first value, sending, by the circuit, the control byte to a command portion of the microcontroller; and
  responsive to the first prefix bit having a second value, sending, by the circuit, the control byte to an address portion of the microcontroller.

20. The method of claim 19, further comprising:
  receiving, by the circuit, a prefix byte including, at a first index of the prefix byte, the first prefix bit;
  receiving, by the circuit, byte count corresponding to the control byte;
  mapping, by the circuit, the byte count to the first index; and
  fetching, by the circuit, the first prefix bit.

* * * * *